United States Patent [19]

Watanabe et al.

[11] Patent Number: 4,500,914

[45] Date of Patent: Feb. 19, 1985

[54] COLOR IMAGING ARRAY AND COLOR IMAGING DEVICE

[75] Inventors: Takashi Watanabe; Shigehiro Miyatake, both of Nara, Japan

[73] Assignee: Sharp Kabushiki Kaisha, Osaka, Japan

[21] Appl. No.: 401,384

[22] Filed: Jul. 23, 1982

[30] Foreign Application Priority Data

Aug. 1, 1981 [JP] Japan ............................ 56-114985[U]
Oct. 20, 1981 [JP] Japan ............................ 56-156499[U]

[51] Int. Cl.$^3$ ............................................. H04N 9/07
[52] U.S. Cl. ................................................... 358/44
[58] Field of Search ................................... 358/41, 44

[56] References Cited

U.S. PATENT DOCUMENTS

| | | | |
|---|---|---|---|
| 3,971,065 | 7/1976 | Bayer ......................... | 358/41 |
| 4,047,203 | 9/1977 | Dillon ......................... | 358/44 |
| 4,054,906 | 10/1977 | Yamanaka .................... | 358/44 |
| 4,064,532 | 12/1977 | Yamanaka .................... | 358/44 |
| 4,245,241 | 1/1981 | Sato ............................ | 358/44 |
| 4,246,600 | 1/1981 | Nakagawa et al. ............ | 358/44 |
| 4,246,601 | 1/1981 | Sato ............................ | 358/44 |

FOREIGN PATENT DOCUMENTS 2903475A 2/1979 Fed. Rep. of Germany .
1576443 11/1976 United Kingdom .

*Primary Examiner*—Michael A. Masinick
*Attorney, Agent, or Firm*—Birch, Stewart, Kolasch & Birch

[57] ABSTRACT

A color imaging array including green, red and blue sensor elements defined by a single solid-state CCD. The green, red and blue sensors are aligned in a predetermined plain having a plurality of sections along both of the horizontal and vertical directions, each section containing two element positions aligned vertically. The green sensor elements occupy element positions in every other sections along both of the horizontal and vertical directions, the red sensor elements occupy one of the two element positions in the remaining sections, and the blue sensor elements occupy another of the two element positions in the remaining sections. Thus, when an image is reproduced using this arrangement, little if any fake color will be produced.

32 Claims, 26 Drawing Figures

ODD FIELD — EVEN FIELD

ODD FIELD — EVEN FIELD

ODD FIELD — EVEN FIELD

ODD FIELD — EVEN FIELD

Fig. 7
| Fig. 7a | Fig. 7b |
Fig. 7a
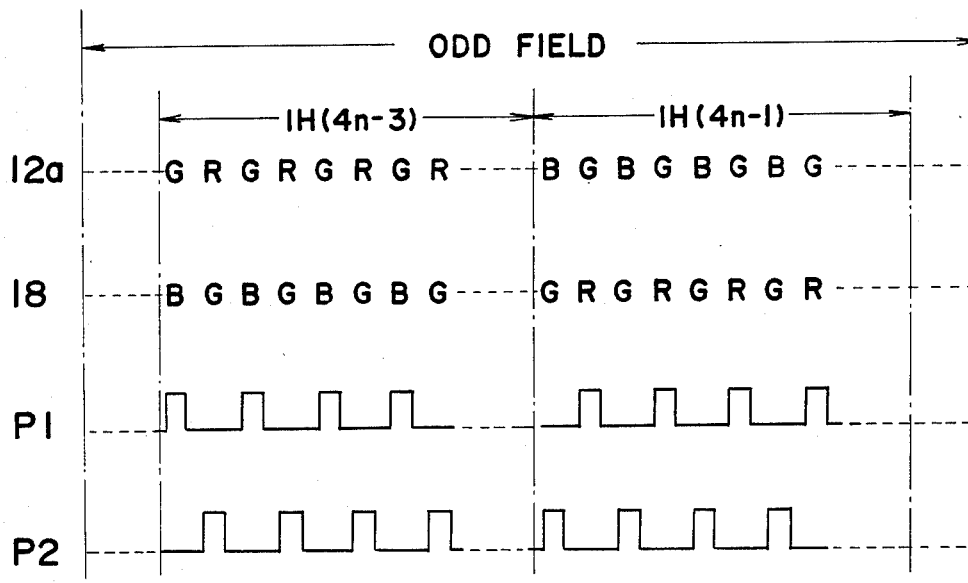
Fig. 7b
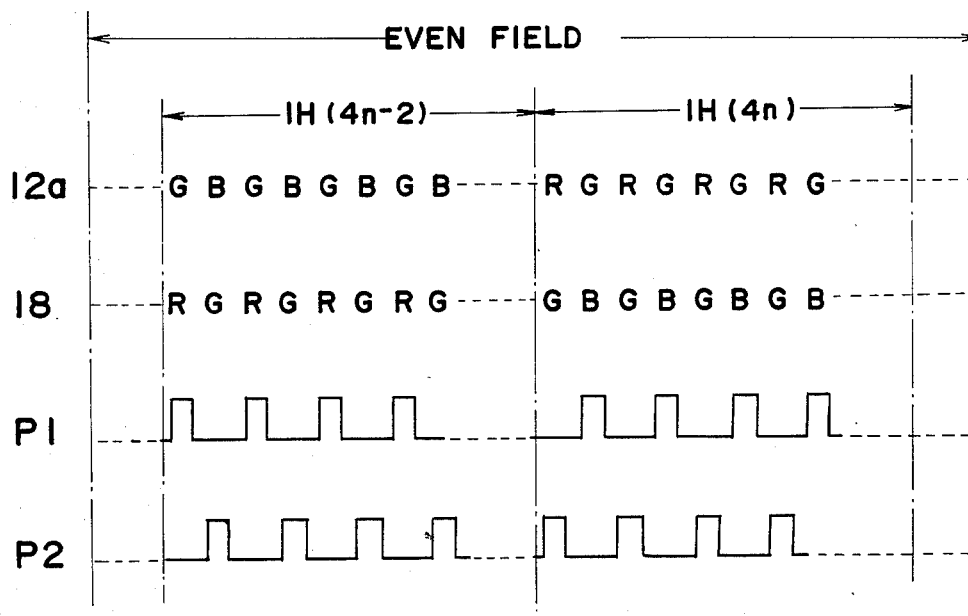

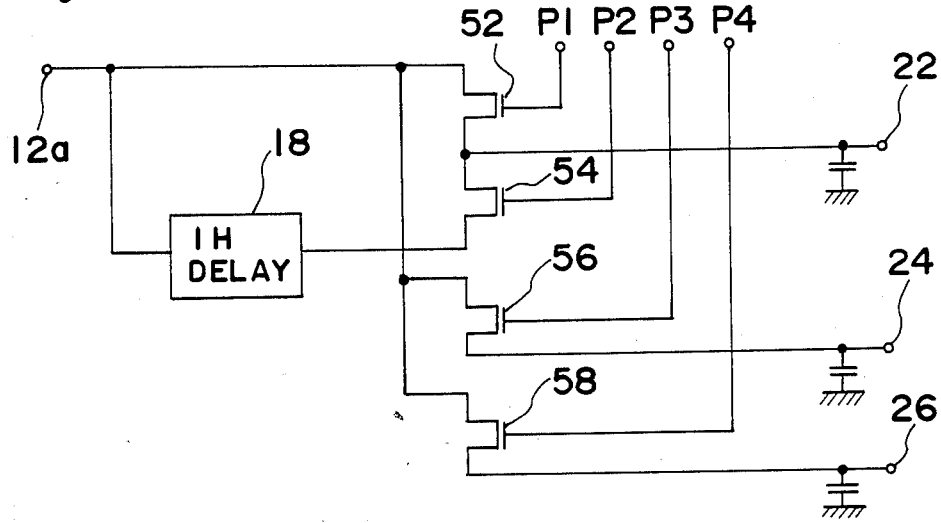

Fig. 13
Fig. 13a
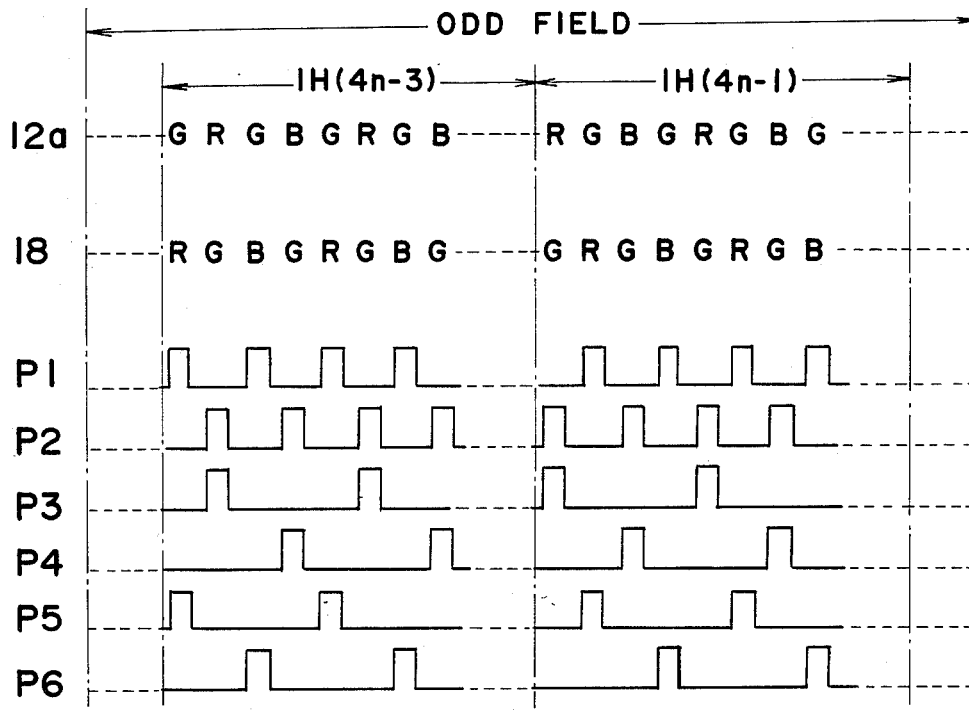
Fig. 13b
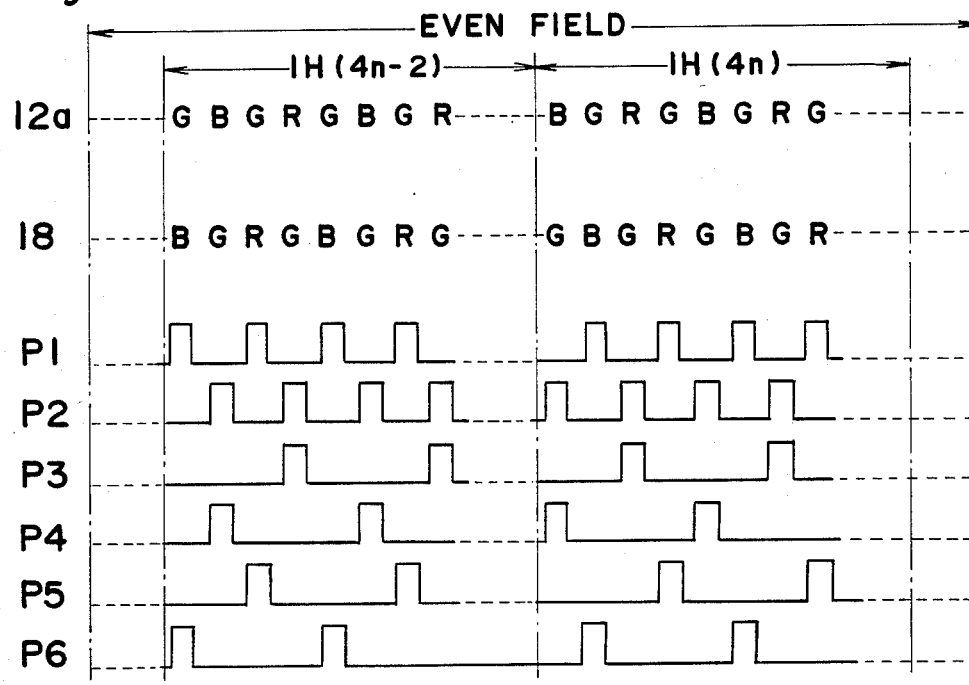

Fig. 14

|  | | | | | | | | |
|---|---|---|---|---|---|---|---|---|
| (8n-7) | G | R | G | B | G | R | G | B |
| (8n-6) | G | B | G | R | G | B | G | R |
| (8n-5) | R | G | B | G | R | G | B | G |
| (8n-4) | B | G | R | G | B | G | R | G |
| (8n-3) | G | B | G | R | G | B | G | R |
| (8n-2) | G | R | G | B | G | R | G | B |
| (8n-1) | B | G | R | G | B | G | R | G |
| (8n) | R | G | B | G | R | G | B | G |

Fig. 15a

| G | Ye | G | Cy |
|---|---|---|---|
| G | Cy | G | Ye |
| Ye | G | Cy | G |
| Cy | G | Ye | G |

Fig. 15b

| W | R | W | B |
|---|---|---|---|
| W | B | W | R |
| R | W | B | W |
| B | W | R | W |

Fig. 15c

| W | Ye | W | Cy |
|---|---|---|---|
| W | Cy | W | Ye |
| Ye | W | Cy | W |
| Cy | W | Ye | W |

COLOR IMAGING ARRAY AND COLOR IMAGING DEVICE

BACKGROUND OF THE INVENTION

1. Field of the Invention

The present invention relates to an improvement of a color imaging array and a color imaging device for use, for example, in a color video camera.

2. Description of the Prior Art

The color video camera picks up an image of a subject and produces a video signal comprising three different color signals, for example, green, red and blue color signals. To this end, the image picked up by the video camera must be analyzed in three different colors. One approach to this is to employ a beam-splitting optical arrangement for splitting the beam into three separated beams, and three image sensors are provided in the paths of the beams for sensing the respective colors.

The above arrangement, however, is accompanied by high manufacturing costs for the three sensors and the beam-splitting optical arrangement. Furthermore, it results in an apparatus which is bulky in size.

Then, there has been proposed a single-sensor system which uses one CCD image sensor with an attached color mosaic filter to color encode the image. When compared with a black-and-white imaging system, such a single-sensor system for sensing the color image has less resolution.

To improve the color resolution, many approaches have been made. For example, U.S. Pat. No. 3,971,065 to Bayer teaches a color imaging array shown in FIG. 1a in which green filters are located at every other element positions along horizontal and vertical directions, and red and blue filters are located in alternate horizontal lines between elements with green filter. When this color imaging array is used in combination with a signal processing device designed for effecting a so-called interlaced readout as diagrammatically shown, that is a readout is effected on odd horizontal lines of increasing line number then with even horizontal lines of increasing line number. The odd rows, consisting of only red and green samples, are read out in sequence and displayed on the odd video field, followed by a display of green and blue elements alone from the even rows on the succeeding even field. This results in a yellow-cyan hue-flicker. The Bayer's color imaging array is also discussed in IEEE Journal of Solid-State Circuits, Vol. SC-13, No. 1, February 1978 the under title "Color Imaging System Using a Single CCD Area Array".

An improved Bayer type color imaging array is shown in FIG. 1b in which the green, red and blue filters are in pairs in the vertical direction, and such pairs of green, red and blue filters are disposed in a similar alignment as that shown in FIG. 1a. In other words, the first two rows in FIG. 1b correspond to the first row in FIG. 1a, and the next two rows in FIG. 1b correspond to the second row in FIG. 1a. When this arrangement of FIG. 1b is coupled with a signal processing device effecting the interlaced readout, the video signals of green, red and blue will be included in each of the odd and even fields and, therefore, this arrangement will not result in any hue-flicker. However, the arrangement of FIG. 1b has a disadvantage in that an image reproduced using the color imaging array of FIG. 1b contains fake color, as explained below.

When an image to be picked up is, e.g., a white stripe that extends vertically along the first column of the color imaging array of FIG. 1b, such a white image will not be reproduced as a white stripe but as a cyan stripe, because the first column contains only two types of sensors (green and blue sensors) whereas three types of sensors are needed to reproduce the color white.

Similarly, when an image to be picked up is, e.g., a white stripe that extends vertically along the second column of the color imaging array of FIG. 1b, such a white image will not be reproduced as a white stripe but as a yellow stripe, because the second column contains only two types of sensors (green and red sensors).

The same disadvantage exists in other prior art color imaging arrays, such as one shown in FIG. 2, disclosed in "1981 National Convention Record of the Institute of Television Engineers of Japan" published July, 1981 on pages 111 and 112 under a title "Interline System CCD Color TV Camera" by Kazushige OOI et al; and another one shown in FIG. 3, disclosed in Japanese Laid Open Patent Application (Tokkaisho) No. 55-163971 published Dec. 20, 1980.

The prior art color imaging array shown in FIG. 2 has the first and second columns occupied only by the green and red sensors, and the third and fourth columns occupied only by the green and blue sensors. Therefore, a white image sensed by the first and second columns will be reproduced as yellow, and a white image sensed by the third and fourth column will be reproduced as cyan.

The prior art color imaging array shown in FIG. 3 has a diagonal belt DB1 occupied only by the green and blue sensors, and a diagonal belt DB2 occupied only by the green and red sensors. Therefore, a white image sensed by such belts will be reproduced as yellow or cyan.

SUMMARY OF THE INVENTION

The present invention has been developed with a view to substantially eliminating the above described disadvantage and has for its essential object to provide an improved color imaging array which can reproduce the image with less fake color.

It is another object of the present invention to provide a color imaging device which employs the improved color imaging array.

In accomplishing these and other objects, a color imaging array according to the present invention comprises, first type of elements sensitive to lights in a first region of the spectrum, second type of elements sensitive to lights in a second region of the spectrum, and third type of elements sensitive to lights in a third region of the spectrum. The three types of elements are aligned in a predetermined plain having a plurality of sections along both of the horizontal and vertical directions, each section containing two element positions aligned vertically. The green sensor elements occupy element positions in every other sections along both of the horizontal and vertical directions, the red sensor elements occupy one of the two element positions in the remaining sections, and the blue sensor elements occupy the other of the two element positions in the remaining sections. Thus, when an image is reproduced using this arrangement, little if any fake color will be produced.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIGS. 7a and 7b taken together as shown in FIG. 7 are timing diagrams showing the sequence of color signals and pulses appearing at major points in the circuit diagram of FIG. 6;

FIGS. 8a, 8b and 8c are diagrams similar to FIG. 4, but particularly showing modifications thereof;

FIG. 9 is a diagram partly showing a color imaging array according to a second embodiment of the present invention;

FIG. 10 is a circuit diagram of a switching circuit shown in FIG. 5 for operating the color imaging array of FIG. 9;

FIGS. 13a and 13b taken together as shown in FIG. 13 are timing diagrams showing the sequence of color signals and pulses appearing at major points in the circuit diagram of FIG. 12;

FIG. 14 is a diagram similar to FIG. 9, but particularly showing a modification thereof; and FIGS. 15a, 15b and 15c are diagrams similar to FIG. 9, but particularly showing further modifications thereof.

DESCRIPTION OF THE PREFERRED EMBODIMENTS

Figure 1A:
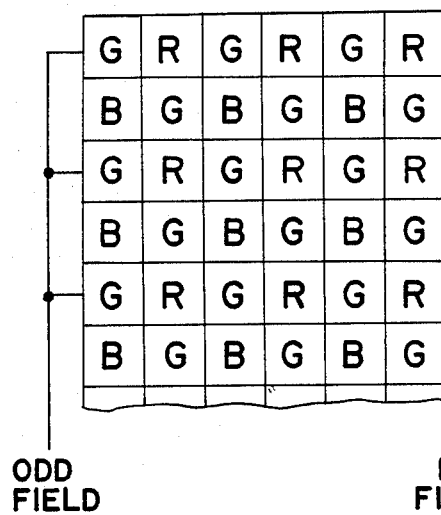
FIGS. 1a, 1b, 2 and 3 are diagrams partly showing the color imaging array according to the prior art.
Figure 1B:
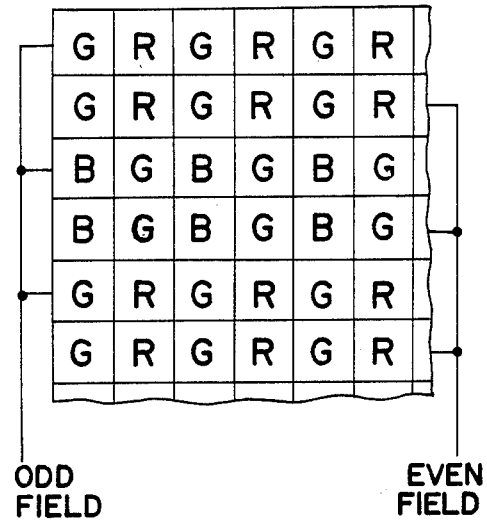
Figure 2:
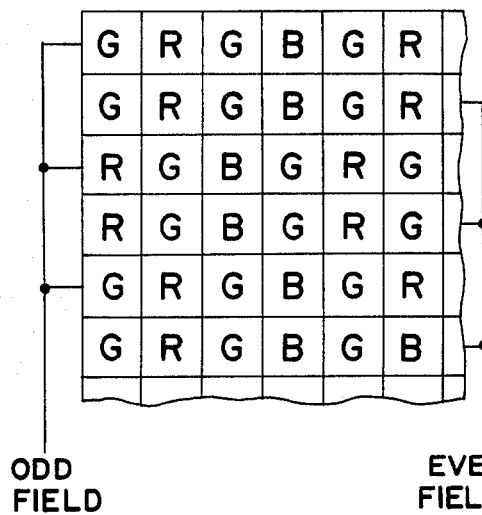
Figure 3:
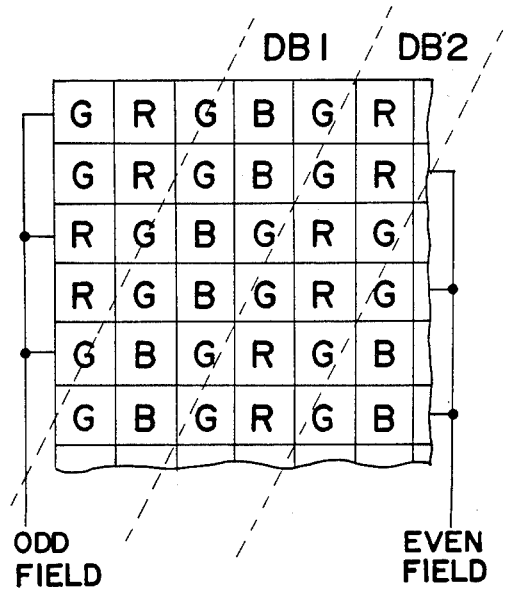
Figure 4:
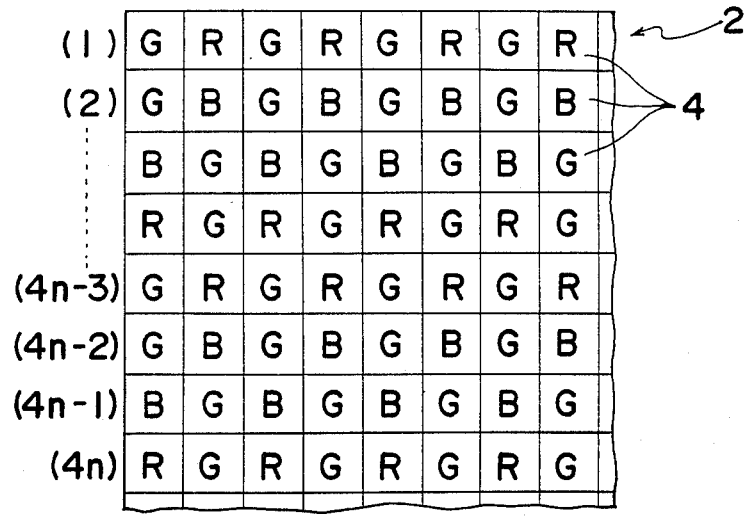
FIG. 4 is a diagram partly showing a color imaging array according to a first embodiment of the present invention.

Referring to FIG. 4, there is shown a diagrammatic partial view of a color imaging array 2, according to the first embodiment of the present invention, formed by a single layer of a solid-state substrate, such as a silicon semiconductor substrate. The color imaging array 2 includes a plurality of sensor elements 4 which are aligned in two orthogonal directions (e.g., horizontal and vertical) as in a form of matrix. Each of the sensor elements is superposed with a filter for selectively transmitting light beams having a particular wavelength. More particularly, the sensor element 4 denoted by a reference character "G" are superposed with a filter selectively transmissive to lights in the green region of spectrum (hereinafter referred to as a green filter), the sensor elements 4 denoted by a reference character "R" are superposed with a filter selectively transmissive to lights in the red region of spectrum (hereinafter referred to as a red filter) and the sensor elements 4 denoted by a reference character "B" are superposed with a filter selectively transmissive to lights in the blue region of spectrum (hereinafter referred to as a blue filter). The sensor elements 4 superposed with the green filter are referred to as a green sensor element. Similarly, the sensor elements 4 superposed with red and blue filters are referred to as red and blue sensor elements, respectively.

Since human eyes have a greater resolving power to the color green than the colors red or blue, the green sensor elements G are disposed in a higher density than the other sensor elements R and B. According to the first embodiment shown in FIG. 4, the color imaging array 2 has a mosaic pattern such that, when n being an integer, a (4n−3)th horizontal line contains a repeating pattern of green and red sensor elements (GRGRGR . . . ) from the leftmost column, a (4n−2)th horizontal line contains a repeating pattern of green and blue sensor elements (GBGBGB . . . ) from the leftmost column, a (4n−1)th horizontal line contains a repeating pattern of blue and green sensor elements (BGBGBG . . . ) from the leftmost column, and a (4n)th horizontal line contains a repeating pattern of red and green sensor elements (RGRGRG . . . ).

With the above arrangement, the first column of the mosaic pattern contains a repeating pattern of green, green, blue and red sensor elements (GGBRGGBR . . . ) from top to bottom.

It is to be noted that, according to the present invention, the first two horizontal lines respectively containing the repeating patterns of (GRGRGR . . . ) and (GBGBGB . . . ) can be eliminated so as to bring the third horizontal line of FIG. 4 as the first horizontal line, and so on. In this case, the first column of the mosaic pattern contains a repeating pattern of (BRGGBRGG . . . ).

It is also to be noted that, according to the present invention, the first column line containing the repeating pattern of (GGBRGGBR . . . ) can be eliminated so as to bring the second column as the first column. In this case, the first horizontal line contains the repeating pattern of (RGRGRG . . . ).

It is further to be noted that, according to the present invention, the first two horizontal lines and the first column line can be eliminated.

In general, the color imaging array according to the present invention can be defined as follows. The three types of sensor elements G, R and B are aligned within a predetermined plane defining a plurality of sections along both of the horizontal and vertical directions, each section containing two element positions aligned vertically. The green sensor elements occupy element positions in every other sections along both of the horizontal and vertical directions, the red sensor elements occupy one of the two element positions in the remaining sections, and the blue sensor elements occupy the other of the two element positions in the remaining section.

By this arrangement, the color imaging array according to the present invention has a novel basic mosaic pattern such that two element positions, defined between a first pair of green sensor elements aligned vertically adjacent to each other and a second pair of green sensor elements aligned vertically adjacent to each other, are occupied with two different sensor elements other than green sensor element.

When an image to be picked up is, e.g., a white stripe that extends vertically along the first vertical line of the color imaging array of FIG. 4, such a white image will be reproduced as a white stripe, because the first vertical line contains three types of sensors, which are needed to reproduce the color white, closely adjacent to each other. The same can be said to an image that extends along any other vertical line, or that extends diagonally. Therefore, an image reproduced using the color imaging array 2 according to the present invention will contain less fake color for the image that extends vertically or diagonally.

It is to be noted that the suppression of the fake color for the image that extends horizontally can be accomplished by another art disclosed in Japanese Patent Application No. 56-188696 in which the present inventors are listed as coinventors.

Figure 5:
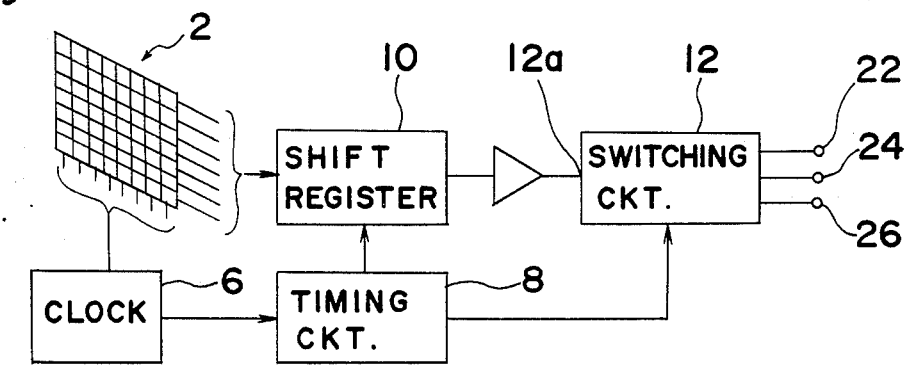
FIG. 5 is a block diagram of a color imaging device according to the present invention.

Referring to FIG. 5, a color imaging device is shown in a simplified manner. The color imaging array 2 is coupled with a clock 6 and a shift register 10 for transmitting image information from individual rows (horizontal lines) of the array to the shift register 10. A timing circuit 8 controlled by the clock 6 is connected to the shift register 10 for driving the shift register 10 in an interlaced readout manner. More particularly, by the timing circuit 8, the shift register 10 produces serially aligned image information in the order of odd lines and even lines. For example, the shift register 10 reads out image information in the order of 1st horizontal line, 3rd horizontal line, 5th horizontal line, . . . , and then 2nd horizontal line, 4th horizontal line, 6th horizontal line, . . . . This operation is repeated again and again, and as will be understood to those skilled in the art, the image information from the odd numbered horizontal lines defines a video signal of odd field and from the even numbered horizontal lines, a video signal of even field.

In FIG. 7a first row 12a, there is shown an alignment of color video signal for one odd field, and in FIG. 7b first row 12a, there is shown an alignment of color video signal for one even field. As understood to those skilled in the art, one odd field and one even field define one frame. In FIGS. 7a and 7b, the number given in parenthesis after each "H" designates the horizontal line number shown in FIG. 4.

The color imaging device shown in FIG. 5 further includes a switching circuit 12 which separates the color signal sequence to a usable form, for example, to parallel green, red and blue video signals. The separated video signals are produced from output terminals 22, 24 and 26.

Figure 6:
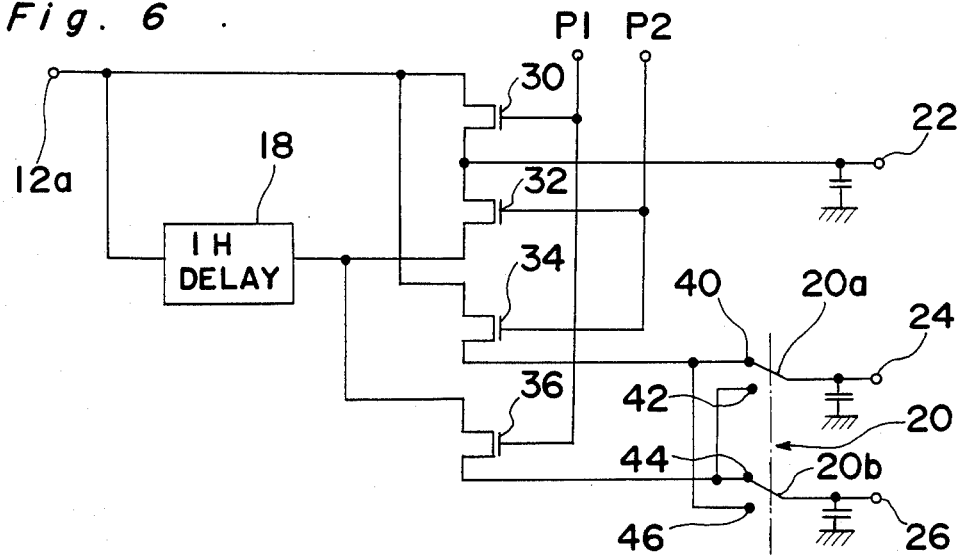
FIG. 6 is a circuit diagram of a switching circuit shown in FIG. 5 for operating the color imaging array of FIG. 4.

Referring to FIG. 6, there is shown a circuit diagram of the switching circuit 12 which is particularly designed for separating the color signal obtained by the use of color imaging array 2 shown in FIG. 4. The switching circuit 12 includes a 1H delay circuit 18 connected to the input 12a. The input 12a receives a series of color signals as shown in the first row 12a in FIGS. 7a and 7b, and the 1 H delay circuit 18 delays the series of color signals from the input 12a by 1H and, accordingly, the delay circuit 18 produces a 1H delayed color signals, as shown in the second row 18 in FIGS. 7a and 7b.

The switching circuit 12 further includes four MOS FETs 30, 32, 34 and 36, and a switching device 20. The MOS FET 30 has its source connected to the input 12a and its drain connected to the output 22. The MOS FET 32 has its source connected to the output of the 1H delay 18 and its drain connected to the output 22. The MOS FET 34 has its source connected to the input 12a and its drain connected to each of terminals 40 and 46. And, the MOS FET 36 has its source connected to the output of the 1H delay 18 and its drain connected to each of terminals 42 and 44. The gates of the MOS FETs 30 and 36 are connected to the timing circuit 8 for receiving a train of pulses P1 (FIGS. 7a and 7b), and the gates of the MOS FETs 32 and 34 are also connected to timing circuit 8 for receiving a train of pulses P2 (FIGS. 7a and 7b). The pulses P1 and P2 are produced from the timing circuit 8, and these two pulses P1 and P2 have opposite phase to each other. More particularly, the pulses P1 are produced in a synchronized manner with every other color signal so that the pulses P1 are present when green color signal is appearing from the input terminal 12a. Also the pulses P2 are produced in a synchronized manner with every other color signal but in opposite relation to the pulses P1 so that the pulses P2 are present when green color signal is appearing from the 1H delay circuit 18.

The switching device 20 includes a pair of contacts 20a and 20b which are connected to the terminals 24 and 26, respectively. Each of the contacts 20a and 20b alternately change their position in a synchronized manner with horizontal line signal between a first contact position in which the contacts 20a and 20b are respectively connected to the terminals 40 and 44 as shown in FIG. 6, and a second contact position in which the contacts 20a and 20b are respectively connected to the terminals 42 and 46. A holding capacitor is connected to each of the terminals 22, 24 and 26.

Next, the operation of the switching circuit 12 shown in FIG. 6 is explained.

When the input terminal 12a receives a series of color signals of (4n−3)th line (FIG. 7a first row 12a), the 1H delay circuit 18 produces a series of color signals (FIG. 7a second row 18) which are delayed 1H. By the pulse P1, the MOS FET 30 separates only the green color signal from the series of color signals from the input terminal 12a. The separated green color signal from the MOS FET 30 is produced from the output terminal 22. In the meantime, by the pulse P2, the MOS FET 32 separates only the green color signal from the series of color signals from the 1H delay circuit 18, and the separated green color signal from the MOS FET 32 is produced from the output terminal 22. Accordingly, the output terminal 22 produces the green color signal from the MOS FETs 30 and 32 in the interlaced manner.

The series of color signals of (4n−3)th line is also applied to the MOS FET 34. By the pulse P2, the MOS FET 34 separates red color signal which is fed to the switching device 20. Since the switching device is in the first contact position, the separated red color signal from the MOS FET 34 is transmitted through the contact 20a to the output terminal 24. In the meantime, the MOS FET 36, receiving the 1H delayed series of color signals, and separates the blue color signal by the pulse P1. Such a separated blue color signal is fed through the contact 20b to the output terminal 26.

Then, when the input terminal 12a receives a series of color signals of (4n−1)th line (FIG. 7a first row 12a), the 1H delay circuit 18 produces a series of color signals (FIG. 7a second row 18) which are delayed 1H. By the pulses P1 and P2, the green color signals from the MOS FETs 30 and 32 are alternately produced from the output terminal 22 in a similar manner described above.

The series of color signals of (4n−1)th line is also applied to the MOS FET 34. By the pulse P2, the MOS FET 34 separates blue color signal which is fed to the switching device 20. Since the switching device is in the second contact position, the separated blue color signal from the MOS FET 34 is transmitted through the contact 20b to the output terminal 26. In the meantime, the MOS FET 36, receiving the 1H delayed series of color signals, and separates the red color signal by the pulse P1. Such a separated red color signal is fed through the contact 20a to the output terminal 24.

It is to be noted that in the switching circuit shown in FIG. 6, each of the MOS FETs 30, 32, 34 and 36 can be replaced with another switching element, such as a junction FET, a bipolar transistor, or other switching circuit such as diode bridge circuit.

It is also to be noted that the sensor elements 4, which have been described as superposed with green, red and blue filters, can be superposed with color filters having complementary relation. For example, as shown in FIG. 8a, the red and blue filters can be replaced with yellow and cyan filters, which are denoted as "Ye" and "Cy", respectively. Another arrangement is shown in FIG. 8b in which the green filters are replaced with white filters denoted as "W". Yet another arrangement is shown in FIG. 8c in which the green, red and blue filters are replaced with white, yellow and cyan filters, respectively.

Referring to FIG. 9, there is shown a diagrammatic partial view of a color imaging array 50, according to the second embodiment of the present invention. As in the first embodiment, the color imaging array 50 has the basic pattern of the present invention such that two element positions, defined between a first pair of green sensor elements aligned vertically adjacent to each other and a second pair of green sensor elements aligned vertically adjacent to each other, are occupied with two different sensor elements other than green sensor element.

More particularly, according to the second embodiment shown in FIG. 9, the color imaging array 50 has such a mosaic pattern that, when n being an integer, a (4n−3)th horizontal line contains a repeating pattern of green, red, green and blue sensor elements (GRGBGRGB . . . ) from the leftmost column, a (4n−2)th horizontal line contains a repeating pattern of green, blue, green and red sensor elements (GBGRGBGR . . . ) from the leftmost column, a (4n−1)th horizontal line contains a repeating pattern of red, green, blue and green sensor elements (RGBGRGBG . . . ) from the leftmost column, and a (4n)th horizontal line contains a repeating pattern of blue, green, red and green sensor elements (BGRGBGRG . . . ).

With the above arrangement, the first column of the mosaic pattern contains a repeating pattern of green, green, red and blue sensor elements (GGRBGGRB . . . ) from top to bottom.

It is to be noted that, according to the present invention, the first two horizontal lines and/or first vertical line can be eliminated so long as the mosaic pattern containing the basic mosaic pattern mentioned above.

When an image to be picked up is, e.g., a white stripe that extends vertically along the first vertical line of the color imaging array of FIG. 9, such a white image will be reproduced as a white stripe, because the first vertical line contains three types of sensors, which are needed to reproduce the color white, closely adjacent to each other. The same can be said to an image that extends along any other vertical line, or that extends diagonally. Furthermore, the color imaging array of FIG. 9 can suppress the production of fake color even for the image that extends horizontally, because there are three types of sensors contained in each horizontal line closely adjacent to each other. Therefore, an image reproduced using the color imaging array 50 according to the present invention will contain less fake color.

Referring to FIG. 10, there is shown a circuit diagram of the switching circuit 12 which is particularly designed for separating the color signal obtained by the use of color imaging array 50 shown in FIG. 9. The other parts of the color imaging device for effecting the signal readout is the same as that shown in the block diagram of FIG. 5. The switching circuit 12 of FIG. 10 includes a 1H delay circuit 18 connected to the input 12a. The input 12a receives a series of color signals as shown in the first row 12a in FIGS. 11a and 11b, and the 1H delay circuit 18 delays the series of color signals from the input 12a by 1H and, accordingly, the delay circuit 18 produces a 1H delayed color signals, as shown in the second row 18 in FIGS. 11a and 11b.

Figure 11:
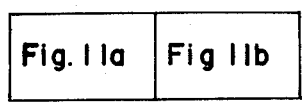
FIGS. 11a and 11b taken together as shown in FIG. 11 are timing diagrams showing the sequence of color signals and pulses appearing at major points in the circuit diagram of FIG. 10.
Figure 11A:
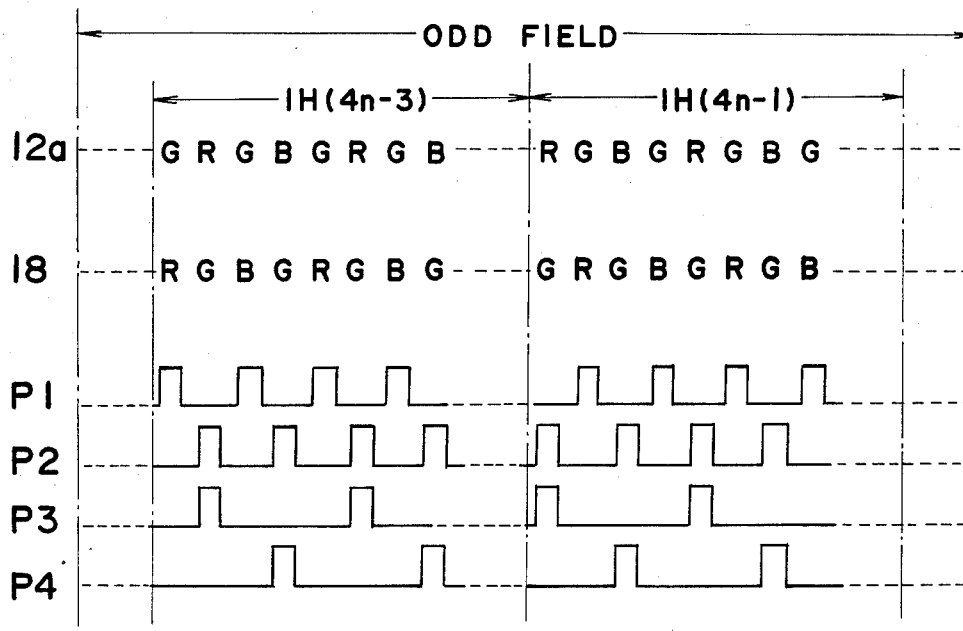
Figure 11B:
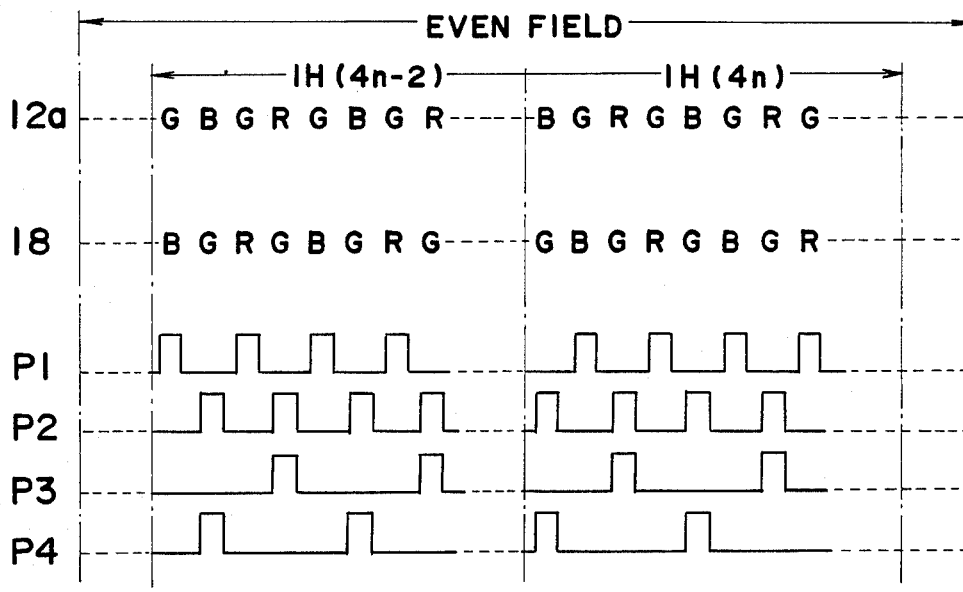

The switching circuit 12 further includes four MOS FETs 52, 54, 56 and 58. The MOS FET 52 has its source connected to the input 12a and its drain connected to the output 22. The MOS FET 54 has its source connected to the output of the 1H delay 18 and its drain connected to the output 22. The MOS FET 56 has its source connected to the input 12a and its drain connected the output 24. And, the MOS FET 58 has its source connected to the input 12a and its drain connected to the output 26. The gates of the MOS FETs 52, 54, 56 and 58 are connected respectively to the timing circuit 8 for receiving a train of pulses P1, P2, P3 and P4 (FIGS. 11a and 11b). The pulses P1 and P2 are the same pulses as the pulses P1 and P2 described above in connection with FIGS. 7a and 7b. The pulses P3 are produced in a synchronized manner with every three other color signals so that the pulses P3 are present when red color singal is appearing from the input terminals 12a. Also the pulses P4 are produced in synchronized manner with every three other color signals but in an opposite relation to the pulses P3 so that the pulses P4 are present when blue color signal is appearing from the input terminal 12a.

Next, the operation of the switching circuit 12 shown in FIG. 10 is explained.

When the input terminal 12a receives a series of color signals of (4n−3)th line (FIG. 11a first row 12a), the 1H delay circuit 18 produces a series of color signals (FIG. 11a second row 18) which are delayed 1H. By the pulse P1, the MOS FET 52 separates only the green color signal from the series of color signals from the input terminal 12a. The separated green color signal from the MOS FET 52 is produced from the output terminal 22. In the meantime, by the pulse P2, the MOS FET 54 separates only the green color signal from the series of color signals from the 1H delay circuit 18, and the separated green color signal from the MOS FET 54 is produced from the output terminal 22. Accordingly, the output terminal 22 produces the green color signal from the MOS FETs 52 and 54 in the interlaced manner.

The series of color signals of (4n−3)th line is also applied to the MOS FETs 56 and 58. By the pulse P3, the MOS FET 56 separates the rod color signal which is produced from the termianl 24. In the meantime, by the pulse P4, the MOS FET 58 separates the blue color signal which is produced from the terminal 26.

In a similar manner, the MOS FETs 52 and 54 separate the green color signal, the MOS FET 56 separates the red color signal, and the MOS FET 58 separates the blue color signal in succeeding lines.

Figure 12:
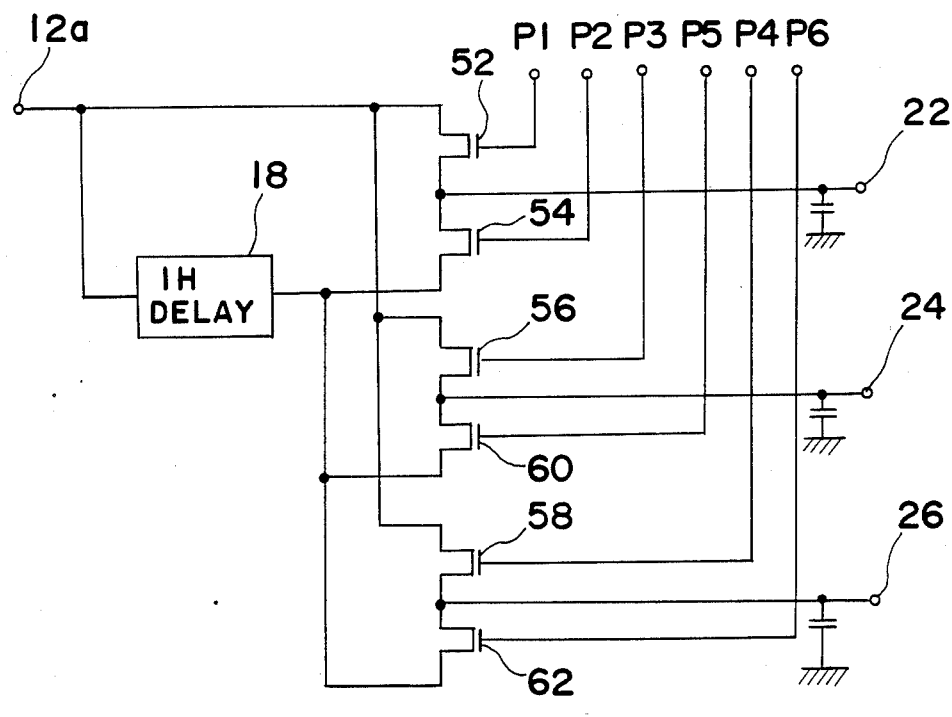
FIG. 12 is a circuit diagram which is a modification of the circuit diagram shown in FIG. 10.

Referring to FIG. 12, there is shown a modification of the switching circuit 12 of FIG. 10. When compared with the switching circuit 12 of FIG. 10, the modified switching circuit 12 of FIG. 12 further has MOS FETs 60 and 62 in which the sources of the MOS FETs 60 and 62 are connected to the 1H delay circuit 18. The drain of the MOS FET 60 is connected to the terminal 24, and the drain of the MOS FET 62 is connected to the terminal 26. The gate of the MOS FET 60 receives pulses P5 (FIG. 13a), and the gate of the MOS FET 62 receives pulses P6 (FIG. 13a). The pulses P5 are produced in a synchronized manner with every three other color signals so that the pulses P5 are present when a red color singal is appearing from the 1H delay circuit 18. Also the pulses P6 are produced in a synchronized manner with every three other color signals but in opposite relation to the pulses P5 so that the pulses P6 are present when a blue color signal is appearing from the 1H delay circuit 18.

In operation, the MOS FET 60 actuated by the pulse P5 extracts red color signals from the series of color signals from the 1H delay circuit 18. Therefore, the terminal 24 produces red color signals obtained alternately from the MOS FETs 56 and 60. Similarly, the MOS FET 62 actuated by the pulse P6 extracts blue color signals from the series of color signals from the 1H delay circuit 18. Therefore, the terminal 26 produces blue color signals obtained alternately from the MOS FETs 58 and 62.

It is to be noted that in the switching circuit 12 shown in FIGS. 10 and 12, each of the MOS FETs 52, 54, 56, 58, 60 and 62 can be replaced with another switching element, such as a junction FET, a bipolar transistor, or other switching circuit such as diode bridge circuit.

Referring to FIG. 14, there is shown a modification of the color imaging array of the second embodiment. The color imaging array 50' shown in FIG. 14 has the same mosaic patter as that shown in FIG. 9 in the first four horizontal lines. In the next four horizontal lines, the color imaging array 50' has red and blue sensor elements disposed in opposite relation to those in the first four lines.

More particularly, according to the modified embodiment shown in FIG. 14, the color imaging array 50' has such a mosaic pattern that, when n being an integer, a (8n−7)th horizontal line contains a repeating pattern of green, red, green and blue sensor elements (GRGBGRGB . . . ) from the leftmost column, a (8n−6)th horizontal line contains a repeating pattern of green, blue, green and red sensor elements (GBGRGBGR . . . ) from the leftmost column, a (8n−5)th horizontal line contains a repeating pattern of red, green, blue and green sensor elements (RGBGRGBG . . . ) from the leftmost column, a (8n−4)th horizontal line contains a repeating pattern of blue, green, red and green sensor elements (BGRGBGRG . . . ), a (8n−3)th horizontal line contains a repeating pattern of green, blue, green and red sensor elements (GBGRGBGR . . . ) from the leftmost column, a (8n−2)th horizontal line contains a repeating pattern of green, red, green and blue sensor elements (GRGBGRGB . . . ) from the leftmost column, a (8n−1)th horizontal line contains a repeating pattern of blue, green, red and green sensor elements (BGRGBGRG . . . ), and a (8n)th horizontal line contains a repeating pattern of red, green, blue and green sensor elements (RGBGRGBG . . . ) from the leftmost column.

Because the color imaging array 50' has the basic mosaic pattern, an image reproduced using the color imaging array 50' will contain less fake color.

It is to be noted that, in the color imaging array 50 or 50', the sensor elements 4, which have been described as superposed with green, red and blue filters, can be superposed with color filters having complementary relation. For example, as shown in FIG. 15a, the red and blue filters can be replaced with yellow and cyan filters "Ye" and "Cy"; as shown in FIG. 15b, the green filters can be replaced with white filters "W"; or as shown in FIG. 15c, the green, red and blue filters can be replaced with white, yellow and cyan filters, respectively.

It is further to be noted that the color imaging device according to the present invention can be formed by any solid-state image sensing device, such as MOS chip, CID chip, CCD chip or BBD chip.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. A color imaging array comprising:
 a plurality of elements including,
  first type of elements sensitive to light in a first region of the frequency spectrum,
  second type of elements sensitive to light in a second region of the spectrum not coextensive with said first region, and
  third type of elements sensitive to light in a third region of the spectrum not coextensive with said first or second regions;
 said plurality of elements arranged in a predetermined plane and having a plurality of element sections along both of the horizontal and vertical directions, each section containing two adjacent elements positioned in vertical alignment,
 said three types of elements being aligned within said predetermined plane such that said first type of elements occupy both element positions in every other one of said sections in both of the horizontal and vertical directions, said second type of elements occupying one of the two element positions in the remaining sections, and said third type of elements occupy other of the two element positions in the remaining sections.

2. A color imaging array as claimed in claim 1, wherein said first, second and third types of elements are sensitive to green, red and blue light, respectively.

3. A color imaging array as claimed in claim 1, wherein said first, second and third types of elements are sensitive to white, yellow and cyan light, respectively.

4. A color imaging array as claimed in claim 1, wherein said first, second and third types of elements are sensitive to green, yellow and cyan light, respectively.

5. A color imaging array as claimed in claim 1, wherein said first, second and third types of elements are sensitive to white, red and blue light, respectively.

6. A color imaging array comprising:
 a plurality of elements including,
  first type of elements sensitive to light in a first region of the frequency spectrum,
  second type of elements sensitive to light in a second region of the spectrum not coextensive with said first region, and third type of elements sensitive to light in a third region of the spectrum not coextensive with said first and second regions;

said three types of elements being aligned horizontally in rows and vertically in columns within a predetermined plane in a mosaic pattern such that, with n being an integer, a (4n−3)th horizontal line contains a repeating pattern of first and second types of elements from the leftmost column, a (4n−2)th horizontal line contains a repeating pattern of first and third types of elements from the leftmost column, a (4n−1)th horizontal line contains a repeating pattern of third and first types of elements from the leftmost column, and a (4n)th horizontal line contains a repeating pattern of second and first types of elements from the leftmost column.

7. A color imaging array comprising:
a plurality of elements including,
first type of elements sensitive to light in a first region of the frequency spectrum,
second type of elements sensitive to light in a second region of the spectrum not coextensive with said first region, and
third type of elements sensitive to light in a third region of the spectrum not coextensive with said first and second regions;
said three types of elements being aligned horizontally and vertically within a predetermined plane in a mosaic pattern such that, with n being an integer, a (4n−3)th horizontal line contains a repeating pattern of first, second, first and third types of elements from the leftmost column, a (4n−2)th horizontal line contains a repeating pattern of first, third, first and second types of elements from the leftmost column, a (4n−1)th horizontal line contains a repeating pattern of second, first, third and first types of elements from the leftmost column, and a (4n)th horizontal line contains a repeating pattern of third, first, second and first types of elements from the leftmost column.

8. A color imaging array comprising:
a plurality of elements including,
first type of elements sensitive to light in a first region of the frequency spectrum,
second type of elements sensitive to light in a second region of the spectrum not coextensive with said first region, and
third type of elements sensitive to light in a third region of the spectrum not coextensive with said first and second regions;
said three types of elements being aligned horizontally and vertically within a predetermined plane in a mosaic pattern such that, with n being an integer, a (8n−7)th horizontal line contains a repeating pattern of first, second, first and third types of elements from the leftmost column, a (8n−6)th horizontal line contains a repeating pattern of first, third, first and second types of elements from the leftmost column, a (8n−5)th horizontal line contains a repeating pattern of second, first, third and first types of elements from the leftmost column, a (8n−4)th horizontal line contains a repeating pattern of third, first, second and first types of elements from the leftmost column, a (8n−3)th horizontal line contains a repeating pattern of first, third, first and second types of elements from the leftmost column, a (8n−2)th horizontal line contains a repeating pattern of first, second, first and third types of elements from the leftmost column, a (8n−1)th horizontal line contains a repeating pattern of third, first, second and first types of elements from the leftmost column and a (8n)th horizontal line contains a repeating pattern of second, first, third and first types of elements from the leftmost column.

9. A color imaging device comprising:
(a) a color imaging array, including,
(i) a plurality of first type elements sensitive to light in a first region of the frequency spectrum,
(ii) a plurality of second type elements sensitive to light in a second region of the spectrum not coextensive with said first region, and
(iii) a plurality of third type elements sensitive to light in a third region of the spectrum not coextensive with said first and second regions;
(iv) said elements being arranged in a predetermined plane having a plurality of sections along both of the horizontal and vertical directions, each section containing two adjacent elements positioned in vertical alignment;
said three types of elements being aligned within said predetermined plane such that said first type of elements occupy both element positions in every other one of said sections in both of the horizontal and vertical directions, said second type of elements occupying one of the two element positions in the remaining sections;
(b) shift register means connected to said color imaging array for sequentially shifting said color signals from said array starting with color signals from the elments of odd numbered horizontal lines line by line and then color signals from the elements of even numbered horizontal lines line by line, thereby producing a serial color signal; and
(c) separating means connected to said shift register means for separating said serial color signal into three parallel color signals including a first color signal, a second color signal and a third color signal.

10. The color imaging device as claimed in claim 9, wherein said separating means comprises:
(i) first gate means for gating the color signal portion of said serial color signal developed by first alternate elements, said first gate means producing the first color signal;
(ii) second gate means for gating the color signal portion of said serial color signal developed by alternate elements different from said first alternate elements, said second gate means producing a combined signal of second and third color signals;
(iii) delay means for delaying said serial color signal by one horizontal line period and for producing a delayed serial color signal;
(iv) third gate means for gating the color signal portion of said delayed serial color signal developed by said first alternate elements, said third gate means producing another first color signal developed in an interlaced manner with said first color signal produced from said first gate means;
(v) fourth gate means for gating the color signal portion of said delayed serial color signal developed by said second alternate elements to said third gate means, said fourth gate means producing a combined signal of second and third color signals;

and (vi) switching means having first and second means for electrically interconnecting operatively provided such that each alternately changes connection in a manner synchronized to a horizontal line period switching interval between a first connection in which the first and second means for interconnecting are connected respectively to said second and fourth gate means, and a second position in which the first and second means for interconnecting are connected respectively to said fourth and second gate means, whereby the output of said first means for interconnecting produces the second color signal and the output of said second means for interconnecting produces the third color signal.

11. The color imaging device as claimed in claim 9, wherein said separating means comprising:

(i) first gate means for gating first alternate portions of said serial color signal, said first gate means producing a first color signal;

(ii) second gate means for gating alternate portions of said second alternate portions different from said first alternate portions of said serial color signal, said second gate means producing a second color signal;

(iii) third gate means for gating remaining portions of said serial color signal not gated by said first and second gate means, said third gate means producing a third color signal;

(iv) delay means for delaying said serial color signal by one horizontal line period and for producing a delayed serial color signal;

(v) fourth gate means for gating first alternate portions of said delayed serial color signal in opposite relation to said first gate means, said fourth gate means producing a first color signal in an interlaced manner with said first color signal produced from said first gate means.

12. The color imaging device as claimed in claim 11, further comprising:

fifth gate means for gating the color signal portion of said delayed serial color signal developed by alternate elements different from said first alternate elements, said fifth gate means producing a second color signal in an interlaced manner with the second color signal produced from said second date means; and sixth gate means for gating the remaining portions of said delayed serial color signal not gated by said first and fifth gate means, said sixth gate means producing a third color signal in an interlaced manner with the third color signal produced from said third gate means.

13. A color imaging array comprising:

a plurality of imaging elements arranged in an M by N matrix array having M elements colinearly arranged in a first direction and N elements colinearly arranged in a second direction orthogonal to the first direction, said elements including, first type elements having a first spectral response to light, second type elements having a second spectral response to light which differs from said first spectral response, and third type elements having a third spectral response to light which differs from both said first and second spectral responses;

said colinearly arrayed elements in both said first and second directions including said first, second and third type elements;

any diagonal band which may be drawn across at least three elements of said array in both said first and second directions overlapping elements of said first, second and third types.

14. The array of claim 13 wherein complete color information may be resolved from the spectral responses of said first, second and third elements.

15. The array of claim 13 wherein said first type elements have a spectral response sensitive to green light, said second type elements and said third type elements having spectral responses sensitive to red and blue light, respectively.

16. The array of claim 15 wherein there are twice as many first type elements in said array than said second type elements or third type elements.

17. A color imaging array comprising:

a plurality of imaging elements arranged in a M column by N row matrix array having M elements colinearly arranged in each of said N rows, N elements being colinearly arranged in M rows aligned orthogonally to said N columns, said elements being of differing types and including, first type elements having a first spectral response to light, second type elements having a second spectral response to light which differs from said first spectral response, third type elements having a third spectral response to light which differs from both said first and second spectral responses;

each of said M columns including elements of said first, second and third types;

any pair of alternate elements in each of said columns, when spaced apart by a single element therebetween, including two differing type elements.

18. The array of claim 17 wherein any diagonal band which may be drawn across at least three of said M columns and of said N rows overlapping elements of said first, second and third types.

19. The array of claim 18 wherein complete color information may be resolved from the spectral responses of all of said differing types of elements.

20. The array of claim 17 wherein said first type elements have a spectral response sensitive to green light, said second type elements and said third type elements having spectral responses sensitive to red and blue respectively.

21. The array of claim 20 wherein therein are twice as many first type elements in said array than said second type elements or third type elements.

22. A color imaging array comprising:

a plurality of imaging elements arranged in an M column by N row matrix array having M elements colinearly arrayed in each of said N rows, N elements being colinearly arrayed in M rows aligned orthogonally to said N columns, said elements of the even ones of said N rows being read as a first field, said elements of the odd ones of said N rows being read in a second field;

said elements being of differing types and including, first type elements having a first spectral response to light, second type elements having a second spectral response to light which differs from said first spectral response, third type elements having a third spectral response to light which differs from both said first and second spectral responses;

each of said M columns including elements of said first, second and third types;

any pair of elements in the same column and in alternate rows, spaced apart by a single row therebetween, including two differing type elements, resolution in the direction said rows extend being thereby improved.

23. The array of claim 22 wherein any diagonal band which may be drawn across at least three of said M columns and of said N rows overlapping elements of said first, second and third types.

24. The array of claim 23 wherein complete color information may be resolved from the spectral responses of all of said differing types of elements.

25. The array of claim 22 wherein said first type elements have a spectral response sensitive to green light, said second type elements and said third type elements having spectral responses sensitive to red and blue light, respectively.

26. The array of claim 25 wherein there are twice as many first type elements in said array than said second type elements or third type elements.

27. The array of claim 17 wherein each of said N rows include elements of said first, second and third types.

28. The array of claim 22 wherein each of said N rows include elements of said first, second and third types.

29. A color imaging array comprising:

a plurality of imaging elements arranged in an M by N matrix array having a surface including M elements colinearly arranged in a vertical direction and N elements colinearly arranged in a horizontal direction, said elements including, first type elements having a first spectral response to light, second type elements having a second spectral response to light which differs from said first spectral response, and third type elements having a third spectral response to light which differs from both said first and second spectral responses;

the arrangement of said imaging elements being defined by first type unit matrixes and second type unit matrixes, which are aligned in columns and rows, said first type unit matrix containing two first type elements aligned in said vertical direction, one second type element positioned horizontally adjacent one of said two first type elements, and one third type element positioned horizontally adjacent the other of said two first type elements and vertically adjacent to said one second type element, said second type unit matrix being identical to said first type unit in a 180° turned position about an axis perpendicular to the surface of said array;

said first and second type unit matrixes being alternately aligned in said vertical direction, and the same type of unit matrixes being aligned in said horizontal direction.

30. A color imaging array comprising:

a plurality of imaging elements arranged in an M by N matrix array having a surface including M elements colinearly arranged in a vertical direction and N elements colinearly arranged in a horizontal direction, said elements including, first type elements having a first spectral response to light, second type elements having a second spectral response to light which differs from said first spectral response, and third type elements having a third spectral response to light which differs from both said first and second spectral responses;

the arrangement of said imaging elements being defined by first type unit matrixes, second type unit matrixes, third type unit matrixes and fourth type unit matrixes, which are aligned in columns and rows, said first type unit matrix containing two first type elements aligned in said vertical direction, one second type element positioned horizontally adjacent one of said two first type elements, and one third type element positioned horizontally adjacent the other of said two first type elements and vertically adjacent said one second type element, said second type unit matrix being different from said first type unit matrix in that said second and third type elements are exchanged, said third type unit matrix being identical to said second type unit matrix in a 180° turned position about an axis perpendicular to the surface of said array, and said fourth type unit matrix being identical to said first type unit matrix in a 180° turned position about an axis perpendicular to the surface of said array, said first and third type unit matrixes being alternately aligned in said vertical direction in every other column, said second and fourth type unit matrixes being alternately aligned in said vertical direction in the remaining columns, said first and second type unit matrixes being alternately aligned in said horizontal direction in every other row, and said third and fourth unit matrixes being alternately aligned in said horizontal direction in the remaining rows.

31. A color imaging array comprising:

a plurality of imaging elements arranged in an M by N matrix array having M elements colinearly arranged in a vertical direction and N elements colinearly arranged in a horizontal direction, said elements including, first type elements having a first spectral response to light, second type elements having a second spectral response to light which differs from said first spectral response, and third type elements having a third spectral response to light which differs from both said first and second spectral responses;

the arrangement of said imaging elements being defined by first type unit matrixes, second type unit matrixes, third type unit matrixes and fourth type unit matrixes, which are aligned in columns and rows, said first type unit matrix containing two first type elements aligned in said vertical direction, one second type element positioned horizontally adjacent one of said two first type elements, and one third type element positioned horizontally adjacent the other of said two first type elements and vertically adjacent said one second type element, said second type unit matrix being different from said first type unit matrix in that said second and third type elements are exchanged, said third type unit matrix being identical to said first type unit matrix in 180° turned position along a vertical axis, and said fourth type unit matrix being identical to said second type unit matrix in 180° turned position along a vertical axis, said first and third type unit matrixes being alternately aligned in said vertical direction in every other column, said second and fourth type unit matrixes being alternately aligned in said vertical direction in the remaining columns, said first and second type unit matrixes being alternately aligned in said horizontal direction in every other row, and said third and fourth unit matrixes being alternately aligned in said horizontal direction in the remaining rows.

32. A color imaging array comprising:

a plurality of imaging elements arranged in an M by N matrix array having M elements colinearly arranged in a vertical direction and N elements colinearly arranged in a horizontal direction, said elements including, first type elements having a first spectral response to light, second type elements having a second spectral response to light which differs from said first spectral response, and third type elements having a third spectral response to light which differs from both said first and second spectral responses;

the arrangement of said imaging elements defined by first type unit matrixes, second type unit matrixes, third type unit matrixes and fourth type unit matrixes, which are aligned in columns and rows, said first type unit matrix containing two first type elements aligned in said vertical direction, one second type element positioned horizontally adjacent one of said two first type elements, and one third type element positioned horizontally adjacent the other of said two first type elements and vertically adjacent said one second type element, said second type unit matrix being different from said first type unit matrix in that said second and third type elements are exchanged, said third type unit matrix being identical to said second type unit matrix in a 180° turned position along a vertical axis, and said fourth type unit matrix being identical to said first type matrix in a 180° turned position along a vertical axis, said first, third, second and fourth type unit matrixes being aligned in this order and repeated in said vertical direction in alternate columns, said second, fourth, first and third type unit matrixes being aligned in this order and repeated in said vertical direction in the remaining columns, said first and second type unit matrixes being alternately aligned in said horizontal direction in alternate rows, said third and fourth unit matrixes being alternately aligned in said horizontal direction in the remaining rows.

* * * * *